US010060166B2

(12) United States Patent
Sayama et al.

(10) Patent No.: US 10,060,166 B2
(45) Date of Patent: Aug. 28, 2018

(54) VEHICLE LATCH DEVICE

(71) Applicant: TS TECH CO., LTD., Asaka-shi, Saitama (JP)

(72) Inventors: Tatsuo Sayama, Tochigi (JP); Masaki Nonaka, Tochigi (JP)

(73) Assignee: TS TECH CO., LTD., Saitama (JP)

(*) Notice: Subject to any disclaimer, the term of this patent is extended or adjusted under 35 U.S.C. 154(b) by 531 days.

(21) Appl. No.: 14/428,704

(22) PCT Filed: Sep. 10, 2013

(86) PCT No.: PCT/JP2013/074321
§ 371 (c)(1),
(2) Date: Mar. 17, 2015

(87) PCT Pub. No.: WO2014/045933
PCT Pub. Date: Mar. 27, 2014

(65) Prior Publication Data
US 2015/0218856 A1  Aug. 6, 2015

(30) Foreign Application Priority Data

Sep. 21, 2012 (JP) .................................. 2012-207852

(51) Int. Cl.
E05C 3/06 (2006.01)
E05B 85/20 (2014.01)
(Continued)

(52) U.S. Cl.
CPC .............. *E05B 85/20* (2013.01); *B60N 2/366* (2013.01); *B60N 2/90* (2018.02); *E05B 79/08* (2013.01);
(Continued)

(58) Field of Classification Search
CPC .......................... Y10S 292/23; Y10T 292/0945
(Continued)

(56) References Cited

U.S. PATENT DOCUMENTS 3,614,146 A * 10/1971 Marx .................... E05B 85/243
292/216
3,695,662 A * 10/1972 Ploughman ........... E05B 85/243
292/216
(Continued)

FOREIGN PATENT DOCUMENTS

CN         102275532 A      12/2011
DE   10 2004 045 988 B3    12/2005
(Continued)

OTHER PUBLICATIONS

Extended European Search Report issued in counterpart European Patent Application No. 13838924.2 dated Apr. 8, 2016.
(Continued)

Primary Examiner — Carlos Lugo
(74) Attorney, Agent, or Firm — Hamre, Schumann, Mueller & Larson, P.C.

(57) ABSTRACT

A latch device for a vehicle which locks or unlocks by engaging with or disengaging from a rod-shaped portion includes a housing and a latch 30 rotatably supported by the housing, the latch including a hook-shaped portion 33 engageable with the rod-shaped portion to form a locked state. The hook-shaped portion 33 includes a first support surface 38A opposed to the rod-shaped portion in the locked state, a protruding portion 37 located in a position closer to a distal end of the hook-shaped portion than the first support surface 38A and configured to protrude relative to the first support surface 38A, and a second support surface 38B provided on the protruding portion 37 and configured to be opposed to the rod-shaped portion. The first support surface 38A and the second support surface 38B are configured to face in different directions, and to thereby be concurrently contactable with the rod-shaped portion.

17 Claims, 14 Drawing Sheets

(51) Int. Cl.
  *B60N 2/36* (2006.01)
  *E05B 79/08* (2014.01)
  *E05B 85/24* (2014.01)
  *E05B 83/00* (2014.01)
  *B60N 2/90* (2018.01)
  *E05C 3/16* (2006.01)

(52) U.S. Cl.
  CPC ............ *E05B 83/00* (2013.01); *E05B 85/243* (2013.01); *Y10T 292/0945* (2015.04)

(58) Field of Classification Search
  USPC .................................................. 292/201, 216
  See application file for complete search history.

(56) References Cited

U.S. PATENT DOCUMENTS

| | | | | |
|---|---|---|---|---|
| 4,079,971 | A * | 3/1978 | Heissner | E05B 85/243 292/216 |
| 4,165,112 | A * | 8/1979 | Kleefeldt | E05L 385/045 292/216 |
| 4,691,949 | A * | 9/1987 | Grantz | E05B 83/16 292/16 |
| 5,163,723 | A * | 11/1992 | Ruckert | E05B 85/26 292/216 |
| 5,474,339 | A * | 12/1995 | Johnson | E05L 381/06 292/201 |
| 5,522,626 | A * | 6/1996 | Dominique | E05L 317/0025 292/198 |
| 5,727,825 | A * | 3/1998 | Spurr | E05B 85/26 292/341.12 |
| 5,918,918 | A * | 7/1999 | Mosley | E05L 377/38 292/341.12 |
| 5,979,951 | A * | 11/1999 | Shimura | E05B 85/26 292/216 |
| 6,012,747 | A * | 1/2000 | Takamura | B60N 2/366 292/210 |
| 6,698,805 | B2 * | 3/2004 | Erices | E05B 77/04 292/201 |
| 7,306,269 | B2 * | 12/2007 | Cetnar | E05B 85/26 292/216 |
| 7,455,336 | B2 * | 11/2008 | Baumchen | B60N 2/01541 292/216 |
| 8,282,141 | B2 * | 10/2012 | Paing | B60N 2/01583 292/216 |
| 8,528,950 | B2 * | 9/2013 | Organek | E05L 317/007 292/216 |
| 8,590,973 | B2 * | 11/2013 | Matsuura | B60N 2/366 292/216 |
| 8,672,386 | B2 * | 3/2014 | Yoo | B60N 2/01583 292/216 |
| 8,882,160 | B2 | 11/2014 | Kamata et al. | |
| 2003/0218348 | A1 | 11/2003 | Yoshino et al. | |
| 2006/0061184 | A1 | 3/2006 | Jennings | |
| 2006/0170224 | A1 * | 8/2006 | Mitchell | E05B 77/04 292/216 |
| 2011/0012415 | A1 | 1/2011 | Muller et al. | |
| 2011/0254343 | A1 | 10/2011 | Vedder et al. | |
| 2013/0285430 | A1 | 10/2013 | Ohba | |

FOREIGN PATENT DOCUMENTS

| | | |
|---|---|---|
| DE | 10 2004 052 746 B3 | 4/2006 |
| DE | 10 2008 033 304 A1 | 1/2010 |
| JP | 8-336861 A | 12/1996 |
| JP | 2544471 Y2 | 5/1997 |
| JP | 2002-201843 | 7/2002 |
| JP | 2007-196721 A | 8/2007 |
| JP | 4318213 | 6/2009 |
| JP | 2011-105132 | 6/2011 |
| JP | 2011-168961 | 9/2011 |
| JP | 2011-255799 A | 12/2011 |
| JP | 2012-505786 | 3/2012 |
| JP | 2013-226993 | 11/2013 |

OTHER PUBLICATIONS

Office Action issued in counterpart Chinese Patent Application No. 201380049174.0 dated Mar. 4, 2016 and corresponding English translation.

Office Action issued in counterpart Japanese Patent Application No. 2012-207852 dated Feb. 9, 2016 and corresponding English translation.

* cited by examiner (a)

(b)

VEHICLE LATCH DEVICE

TECHNICAL FIELD

The present invention relates to latch devices for a vehicle, and particularly to a latch device for a vehicle for use in locking a vehicle part.

BACKGROUND ART

In general, a seat provided rotatably relative to a vehicle body has its leg or the like provided with a latch device; this latch device is engaged with a rod-shaped portion of a striker fixed to the vehicle body, and the seat is thereby locked to the vehicle body. Such a latch device is configured, for example as disclosed in Patent Literature 1, such that a latch, a ratchet or any other rotatable part is supported by a base plate. The latch has a slot formed therein, and the slot is configured to receive the striker so that the latch is engaged with the striker.

CITATION LIST

Patent Literature

Patent Literature 1: JP 4318213 B2

SUMMARY OF INVENTION

However, as an insurance against a possibility that such a strong force as would separate the whole latch device from a striker could be exerted on the latch device, there is a need for an enhanced capability of a latch to hold the striker.

With this in view, it is an object of the present invention to provide a latch device for a vehicle, in which an enhanced capability to hold a rod-shaped portion of a striker or the like is provided.

It is another object of the present invention to provide a latch constructed less fragilely, and more smoothly engageable with a rod-shaped portion.

It is still another object to reduce the possibility that a latch will catch on a housing, so that the latch can be operated smoothly.

The present invention which may solve the above-described problems can be embodied in a latch device for a vehicle, for locking or unlocking by engaging with or disengaging from a rod-shaped portion, which latch device for a vehicle comprises: a housing; and a latch rotatably supported by the housing, the latch including a hook-shaped portion engageable with the rod-shaped portion to form a locked state, wherein the hook-shaped portion includes: a first support surface configured to be opposed to the rod-shaped portion in the locked state; a protruding portion located in a position closer to a distal end of the hook-shaped portion than the first support surface, the protruding portion being configured to protrude relative to the first support surface; and a second support surface provided on the protruding portion, the second support surface being configured to be opposed to the rod-shaped portion, and wherein the first support surface and the second support surface are configured to face in different directions, and to thereby be concurrently contactable with the rod-shaped portion.

With the latch device for a vehicle configured as described above, when a strong force as would separate the whole latch device for a vehicle from a striker is given to the latch device for a vehicle, the rod-shaped portion would slip off the first support surface of the hook-shaped portion, but come in contact with the second support surface on the protruding portion which protrudes relative to the first support portion. Then, the rod-shaped portion is simultaneously in contact with and supported by the both of the first support surface and the second support surface, and thus the hook-shaped portion can hold the rod-shaped portion firmly.

The latch device for a vehicle as described above may be configured such that the rod-shaped portion has a shape of a circular cylinder, wherein the first support surface is a flat surface, a convex surface, or a concave surface having a radius of curvature greater than a radius of the rod-shaped portion, and wherein the second support surface is a flat surface, a convex surface, or a concave surface having a radius of curvature greater than the radius of the rod-shaped portion.

With this configuration, in which the rod-shaped portion has a shape of a circular cylinder, the first support surface and the second support surface can be configured to be simultaneously contactable with the rod-shaped portion.

In the latch device for a vehicle as described above, the second support surface may preferably be configured to face toward an axis of rotation on which the latch is rotatable relative to the housing, or to face toward a position closer to a proximal end of the hook-shaped portion than the axis of rotation.

With this configuration, the second support surface can be made more likely to support the rod-shaped portion, so that the hook-shaped portion can hold the rod-shaped portion more firmly.

The latch device for a vehicle as described above may preferably be configured such that the housing has a receptacle slot so formed as to receive the rod-shaped portion therein, wherein a side of the protruding portion located at the distal end of the hook-shaped portion of the latch in an unlocked state is aligned with an edge of the receptacle slot when viewed in a direction of an axis of rotation of the latch.

With this configuration, the distal-end portion and the protrusion of the latch can be designed to be as large as possible without hampering the rod-shaped portion from entering the receptacle slot.

In the latch device for a vehicle as described above, the latch may preferably comprise a latch body, and a cover that covers part of the latch body, the cover being softer than the latch body, wherein the protruding portion is exposed out of the cover.

With this configuration, the soft cover can serve to reduce operating noise of the latch, and the rod-shaped portion can be supported firmly by the latch body per se because the protruding portion is exposed out of the cover.

In the latch device for a vehicle as described above, the protruding portion may preferably be provided along an overall length in an axial direction of the latch.

With this configuration in which the protruding portion is provided along the overall length in the axial direction of the latch, the rigidity of the protruding portion is enhanced and the rod-shaped portion can be supported firmly thereby.

In the latch device for a vehicle as described above, the protruding portion may preferably have two ends in an axial direction of the latch, the two ends having chamfered edges.

With this configuration in which the two ends of the protruding portion have chamfered edges, i.e., edges chamfered with flat surfaces or edges rounded, the possibility that the latch will catch on the housing can be reduced so that the latch can be operated smoothly.

The other features and advantages of the present invention will be more apparent from the following description elaborated with reference to the accompanying drawings.

DESCRIPTION OF EMBODIMENTS

Figure 1:
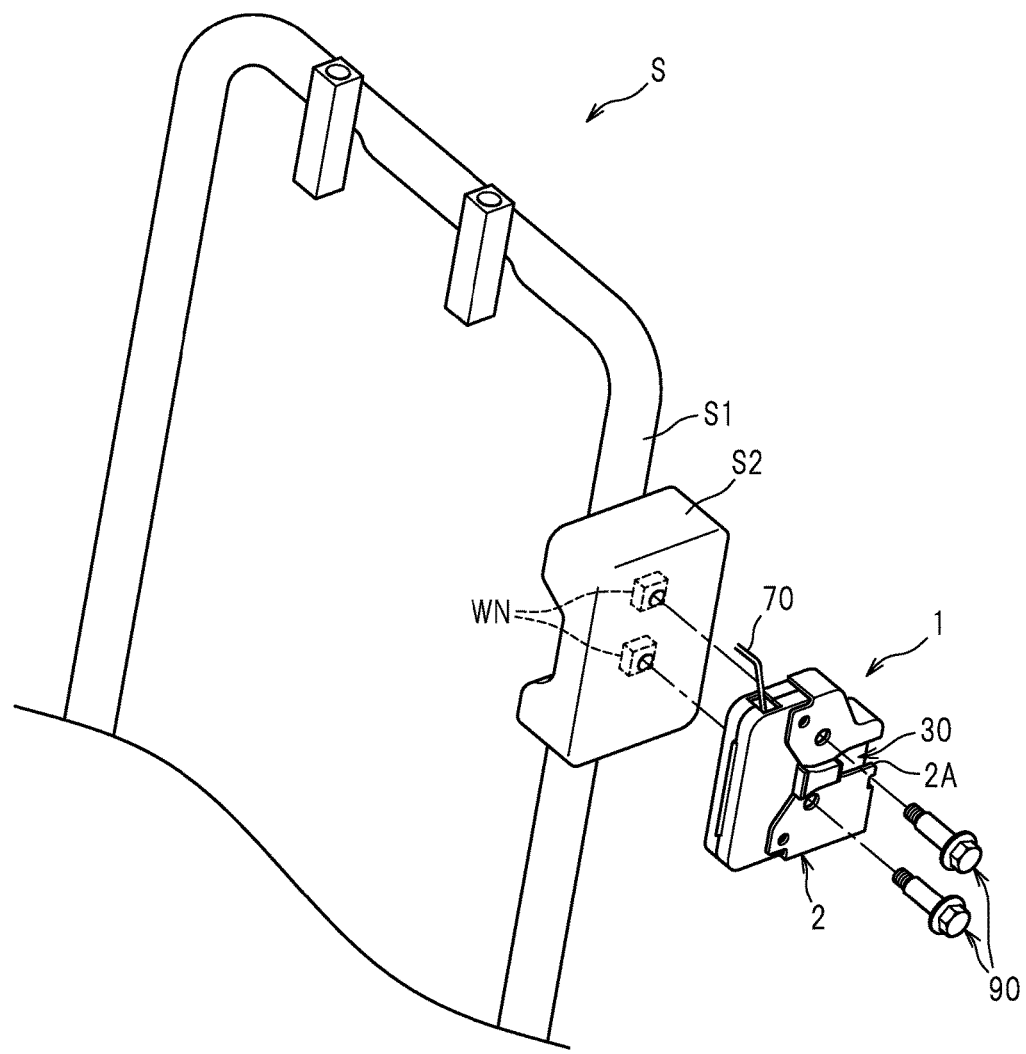
FIG. 1 is a perspective view of a seat frame of a vehicle seat in which a latch device for a vehicle is provided.

Hereafter, a detailed description will be given of one embodiment of a latch device for a vehicle according to the present invention with reference made to the accompanying drawings. As shown in FIG. 1, a latch device 1 for a vehicle according to one embodiment is provided, for example, on a frame S (particularly, on a side frame S1 that constitutes a backrest) of a vehicle seat for an automobile, or the like. As one example, a bracket S2 made of sheet metal is welded to the side frame S1, and the latch device 1 for a vehicle is fixed using bolts 90 to weld nuts WN fixed to the bracket S2.

The latch device 1 for a vehicle comprises a housing 2 and mechanical parts such as a latch 30 housed therein. A receptacle slot 2A which opens to the right in FIG. 1 is formed in the housing 2, and the latch 30 is brought into a closed state or an open state by a hook-shaped portion entering or exiting this receptacle slot 2A. The latch device 1 for a vehicle can establish a locked state, from an unlocked state in which the latch 30 is open, by the latch 30 pressed against and engaged with a rod-shaped portion P1 of a striker P fixed to a vehicle body (see FIG. 5). The latch device 1 for a vehicle can establish an unlocked state by pulling a rod 70 so that the latch 30 is operated from the closed state into the open state, as described later in detail.

Figure 2:
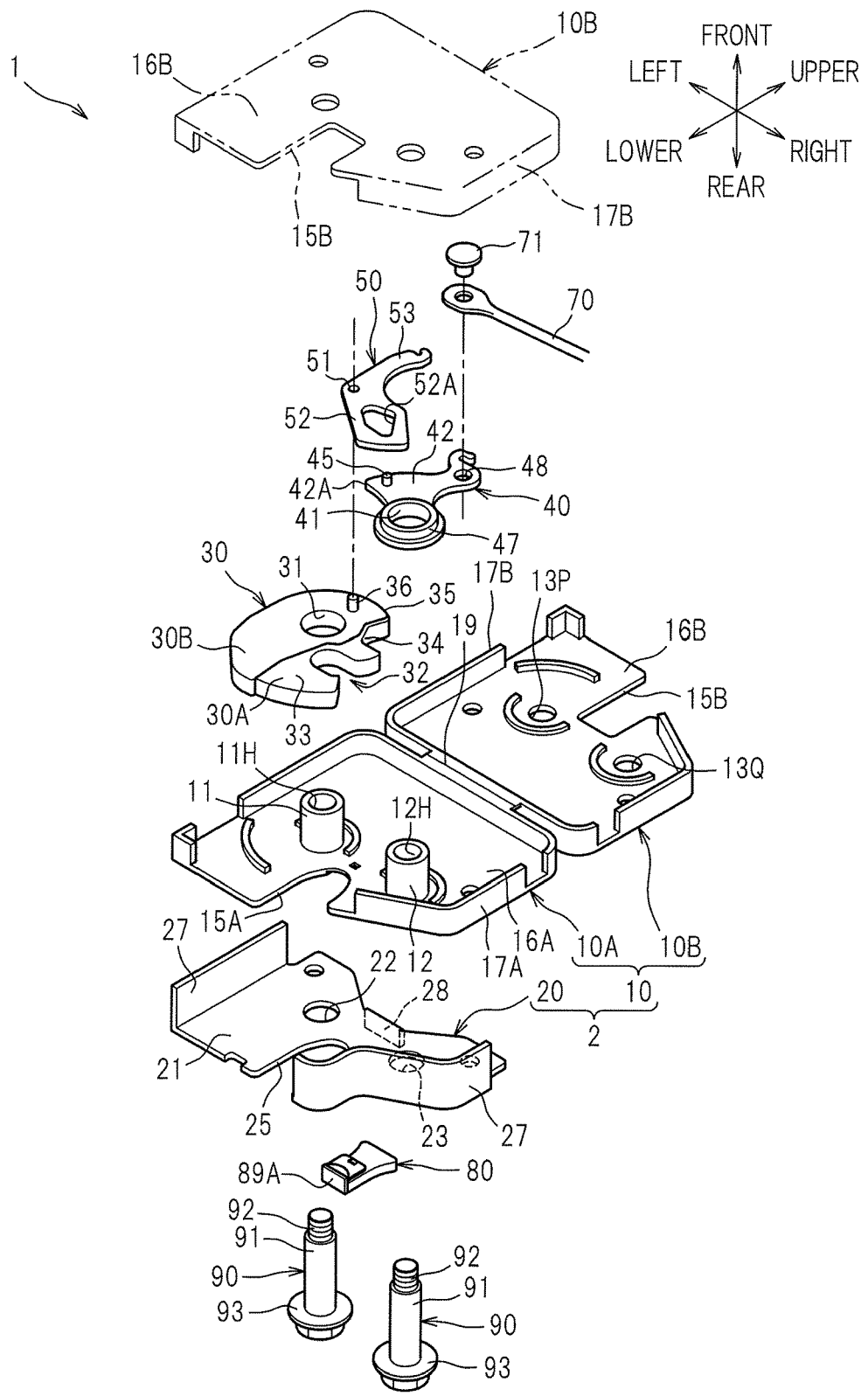
FIG. 2 is an exploded perspective view of the latch device for a vehicle.

As shown in FIG. 2, the latch device 1 for a vehicle mainly includes a housing 2, a latch 30, a ratchet 40, a lever member 50, a rod 70, and a load-receiving member 80. In the following description of the structure of the latch device 1 for a vehicle, the terms upper (upward)/lower (downward), left/right and front/rear will be used as representing upward/downward, leftward/rightward and frontward/rearward directions indicated by arrows in FIG. 2 for convenience of explanation; it is however to be understood that the latch device 1 for a vehicle may be used in any postures as desired.

The housing 2 includes a plastic housing 10 made of plastic, and a reinforcing plate 20 made of sheet steel (metal). The latch device 1 for a vehicle is designed to achieve significant reduction in weight by adopting the plastic housing 10, and to ensure necessary rigidity and strength by partially providing the reinforcing plate 20.

The plastic housing 10 includes a lower case 10A and an upper case 10B, each shaped like a tray having one side open; the lower and upper cases 10A, 10B are connected via a hinge 19 formed of a thinned portion, and formed into an integral piece. This plastic housing 10 can be formed integrally using a set of dies. The upper case 10B can be turned on the hinge 19 relative to the lower case 10A, and the upper case 10B and the lower case 10A can be combined together with their openings fitted to each other, into a box-like shape.

The lower case 10A includes a base portion 16A shaped like a flat plate, and sidewall portions 17A raised from some of segmented parts of an outer peripheral edge of the base portion 16A, so as to form a tray-like shape. A receptacle slot 15A corresponding to the receptacle slot 2A is formed at a lower edge of the base portion 16A. Protruding inwardly from the base portion 16A are cylindrical first and second bosses 11, 12 located at the left and right sides of the receptacle slot 15A in positions slightly apart upwardly from the receptacle slot 15A. The first boss 11 and the second boss 11 are both formed integrally with the base portion 16A.

The first boss 11 has a bolt hole 11H pierced along its axial direction in the form of a through hole having a circular cross section. The second boss also has a bolt hole 12H pierced along its axial direction in the form of a through hole having a circular cross section. The bolt hole 11H and the bolt hole 12H have substantially the same diameter as those of the shanks 91 of bolts 90.

The upper case 10B is not provided with the first boss 11 or the second boss 12; except for that, its internal structure defining the plastic housing 10 is designed substantially symmetrically to that of the lower case 10A with respect the hinge 19. The upper case 10B includes a base portion 16B shaped like a flat plate, and sidewall portions 17B raised from some of segmented parts of an outer peripheral edge of the base portion 16B, so as to form a tray-like shape. A receptacle slot 15B corresponding to the receptacle slot 2A is formed at an upper edge (lower edge when viewed after assembly) of the base portion 16B. In the base portion 16B, bolt holes 13P, 13Q are formed, which are located at the left and right sides of the receptacle slot 15B in positions slightly apart downwardly (upwardly when viewed after assembly) from the receptacle slot 15A.

The reinforcing plate 20 is so formed as to cover a region of the outer side of the lower case 10A other than part of its upper area, and includes a base portion 21 shaped like a flat plate, and sidewall portions 27 raised from left-side and right-side parts of an outer peripheral edge of the base portion 21. Although not illustrated in detail, the sidewall portions 27 of the reinforcing plate 20 can be fitted on the sidewall portions 17A of the lower case 10A so as to be tentatively attached to the lower case 10A.

Figure 6:
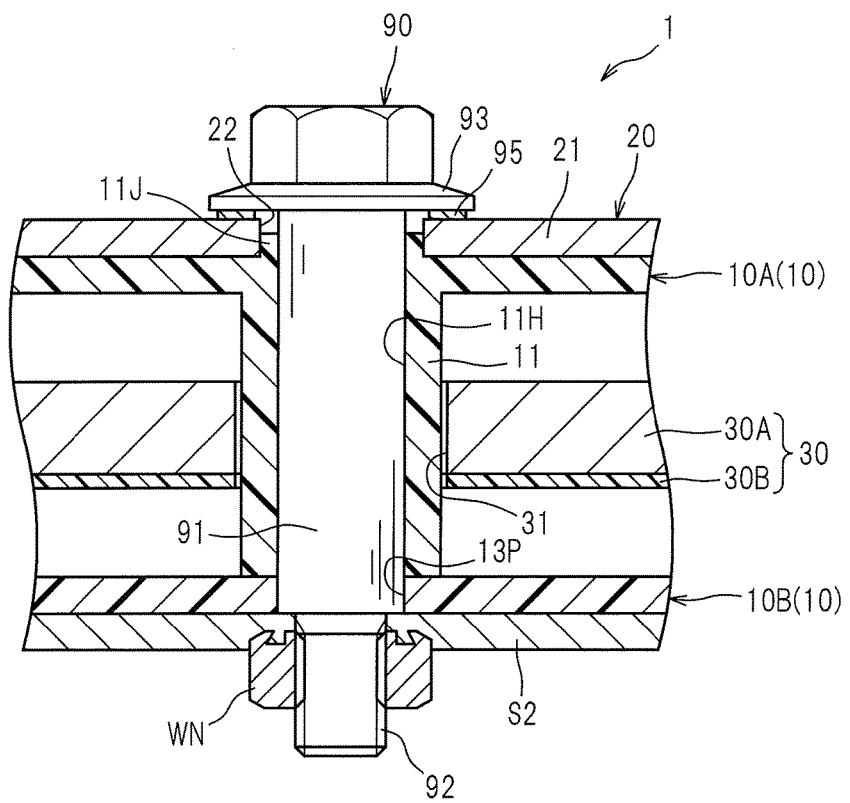
FIG. 6 is a sectional view for explaining a structure for rotatably supporting the latch.

The base portion 21 has locating holes 22, 23 formed therein in positions corresponding to locating projections protrusively formed on the lower case 10A in positions rearwardly of the first boss 11 and the second boss 12 of the lower case 10A (only projection 11J corresponding to the first boss 11 is shown in FIG. 6), which locating holes 22, 23 are designed to fit on these projections. A receptacle slot 25 corresponding to the receptacle slot 2A is formed at a lower edge of the base portion 21.

On an outer side of the reinforcing plate 20 is provided a flange 28 which is formed at an upper edge of the reinforcing plate 20, by bending outward to bring up an end portion thereof. The flange 28 is a portion that is brought into contact with the load-receiving member 80 and withstands a force received from a rod-shaped portion P1 of a striker P (see FIG. 5).

The latch 30 is a member configured to engage with or disengage from the rod-shaped portion P1 of the striker P, for locking or unlocking the latch device 1 for a vehicle. The latch 30 is formed by stamping a thick metal plate, with a first hole 31 pierced through in a direction of its thickness, and is rotatably supported by the plastic housing 10 with the first hole 31 fitted on an outer periphery of the first boss 11. The latch 30 is, to be more specific, configured to comprise a latch body 30A made of metal and a cover 30B made of plastic which is softer than the latch body 30A, which cover 30B is disposed to cover a front-side surface and part of a side edge of the latch body 30A. The cover 30B is provided to improve smoothness which facilitates sliding on the ratchet 40. The cover 30B is mounted onto the latch body 30A in a direction that is along the axial direction of the first hole 31.

Figure 3:
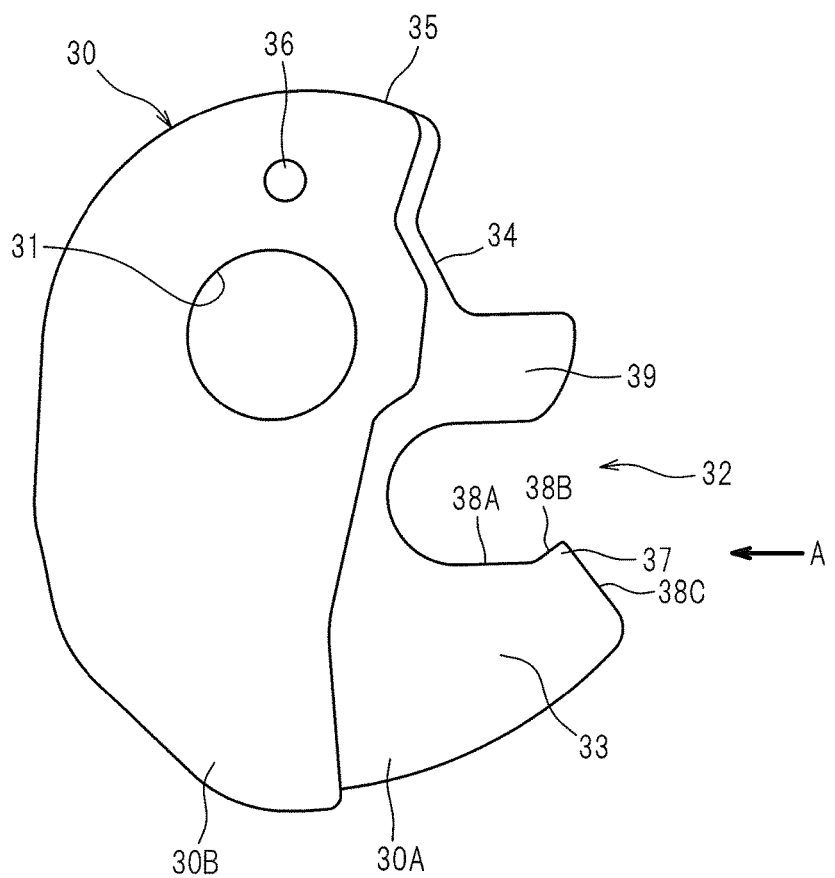
FIG. 3 is an enlarged view of a latch.
Figure 5:
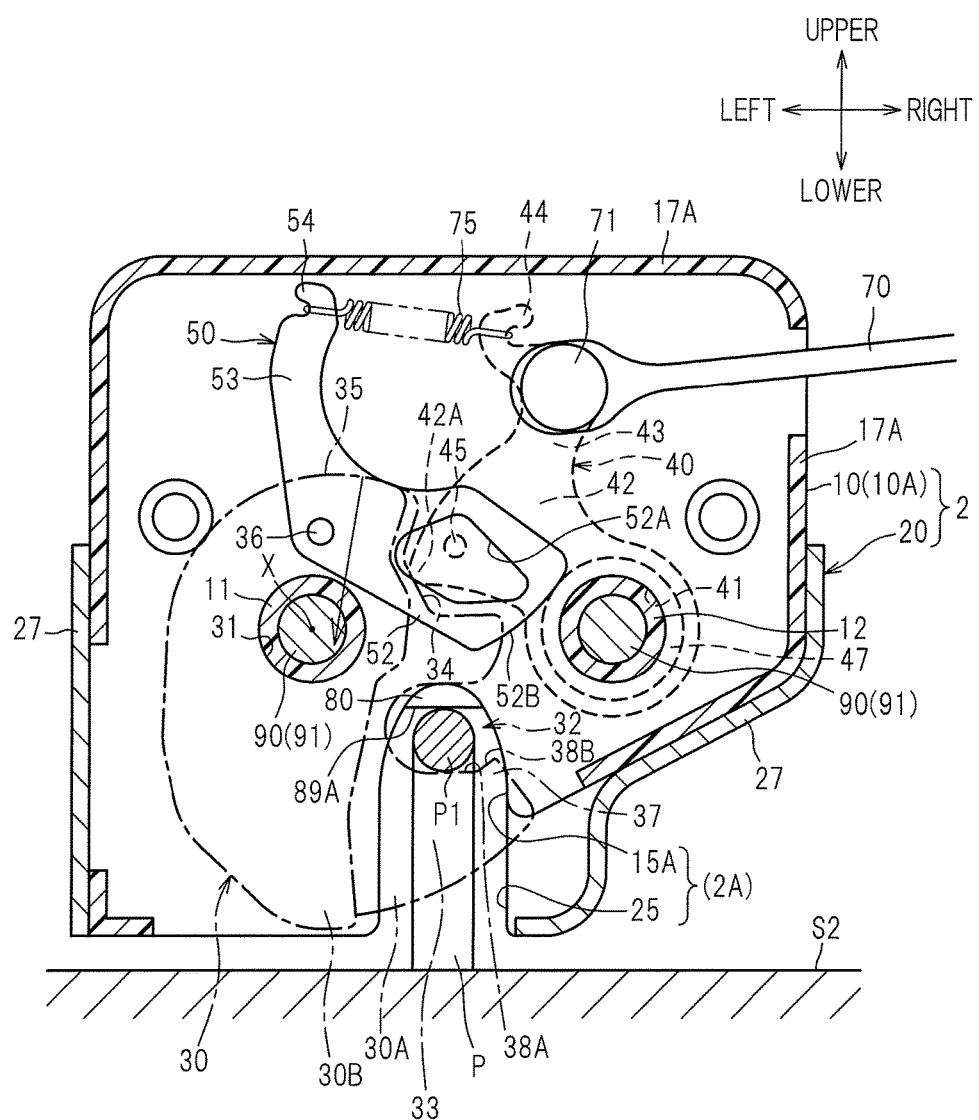
FIG. 5 is a sectional view showing the latch device for a vehicle in a locked state.

As shown in FIG. 3, the latch 30 has a slot 32 for receiving the rod-shaped portion P1, and includes a hook-shaped portion 33 which defines an outer side of the slot 32, and a projecting portion 39 which projects at a position near the first hole 31 and defines a side opposed to the hook-shaped portion 33. The latch 30 further has a lock recess 34 recessed toward the first hole 31; the lock recess 34 is formed at an upper-and-right-side edge of the latch 30 positioned as shown in FIG. 5. An outer periphery (side) adjacent to the left side of the lock recess 34 is an open contact surface 35 which comes in contact with the ratchet 40 when the latch 30 is brought into an open state, so that the latch 30 is kept in the open state. The open contact surface 35 is an outwardly bulging convexly curved surface; in an entire range thereof with which a lock engaging portion 42A of the ratchet 40 (which will be described later) may come in contact, a direction from a surface of the outer periphery to the center of curvature (see arrow in FIG. 5) is shifted to one side (to the right, in this embodiment) with respect to the axis of rotation of the latch 30. Accordingly, a force received by the latch 30 from the lock engaging portion 42A acts as a force causing the latch 30 to rotate clockwise, that is, toward the open state.

The latch 30 includes a pin 36 press-fitted therein which protrudes frontward for the lever member 50 to be pivoted thereon.

The hook-shaped portion 33 includes: a first support surface 38A configured to be opposed from a lower side, and located nearest, to the rod-shaped portion P1 in the locked state where the rod-shaped portion P1 is engaged therewith as shown in FIG. 5; a protruding portion 37 located in a position closer to a distal end of the hook-shaped portion 33 than the first support surface 38A and configured to protrude relative to the first support surface 38A; and a second support surface 38B provided on the protruding portion 37 and configured to be opposed to the rod-shaped portion P1.

The first support surface 38A and the second support surface 38B are configured to face in different directions, and positioned adjacently so as to allow the rod-shaped portion P1 to concurrently get in contact with the both of them. In the present embodiment, the rod-shaped portion P1 has a shape of a circular cylinder. Each of the first support surface 38A and the second support surface 38B is configured to be a flat surface, a convex surface, or a concave surface having a radius of curvature greater than a radius of the rod-shaped portion, in order that the first support surface 38A and the second support surface 38B are made concurrently contactable with the rod-shaped portion P1. By way of example, the first support surface 38A and the second support surface 38B in this embodiment are both flat. Since the first support surface 38A and the second support surface 38B are configured to face in different directions and have sufficient lengths, the first support surface 38A and the second support surface 38B are concurrently contactable with the rod-shaped portion P1 when the rod-shaped portion P1 comes in a corner defined by the first support surface 38A and the second support surface 38B.

Figure 10:
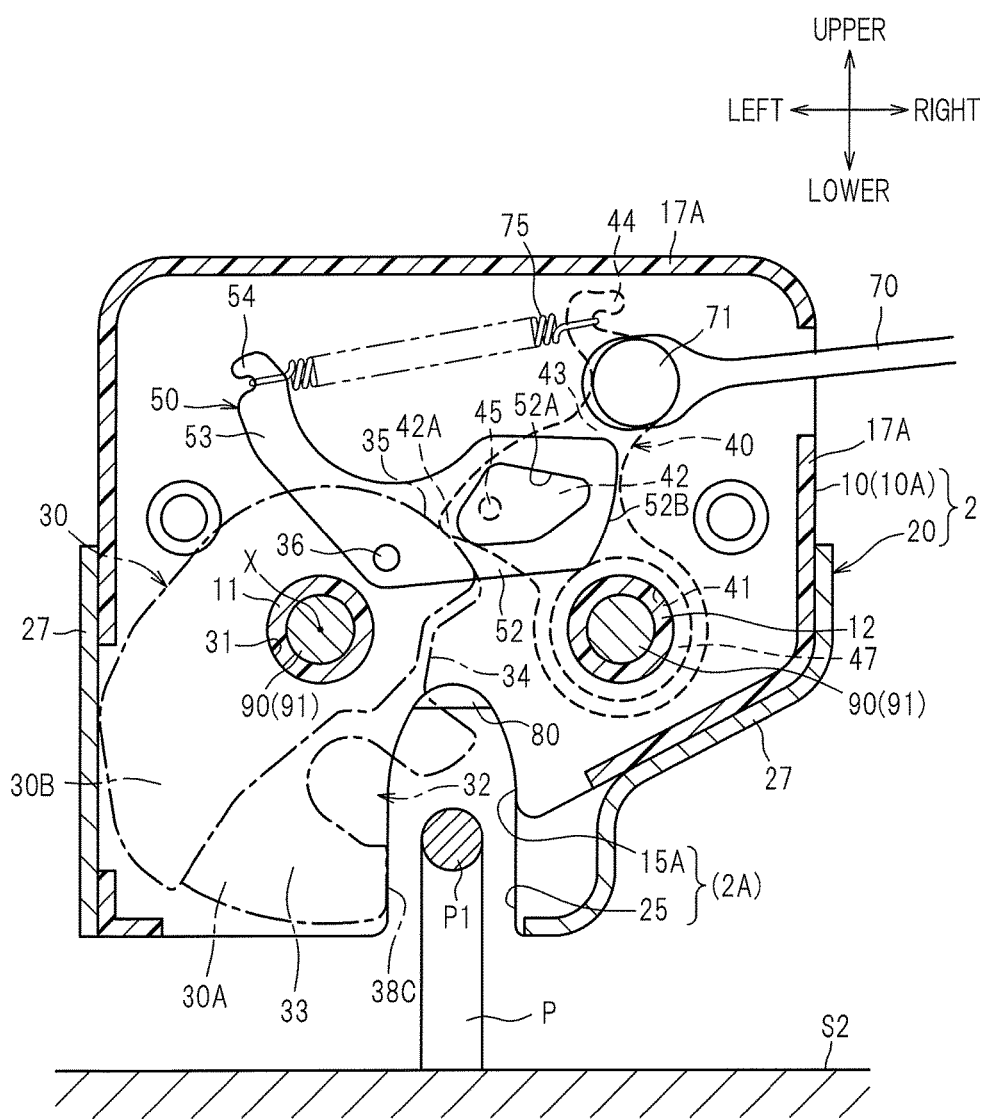
FIG. 10 is a diagram for explaining an operation of the latch device for a vehicle, showing an unlocked state.

A side 38C of the protruding portion 37 located at the distal end of the hook-shaped portion 33 is aligned, in an unlocked state as shown in FIG. 10, with an edge of a receptacle slot 2A when viewed in a direction of an axis X of rotation of the latch 30. With this configuration, the distal end portion of the latch 30 and the protruding portion 37 can be designed to have as large a size as possible for enhanced ruggedness without interfering with the entry of the rod-shaped portion P1 into the receptacle slot 2A. In other words, the rod-shaped portion P1 and the latch 30 can be engaged with each other smoothly.

The protruding portion 37 is exposed out of the aforementioned soft cover 30B. Accordingly, when the second support surface 38B of the protruding portion 37 supports the rod-shaped portion P1, the latch body 30A may be used to support the rod-shaped portion P1 securely. In cases where the cover 30B is not of a coating type but of an attachment type, the cover 30B can be attached onto the latch body 30A with increased ease because the protruding portion 37 is provided in a position exposed outside the cover 30B.

Figure 4:
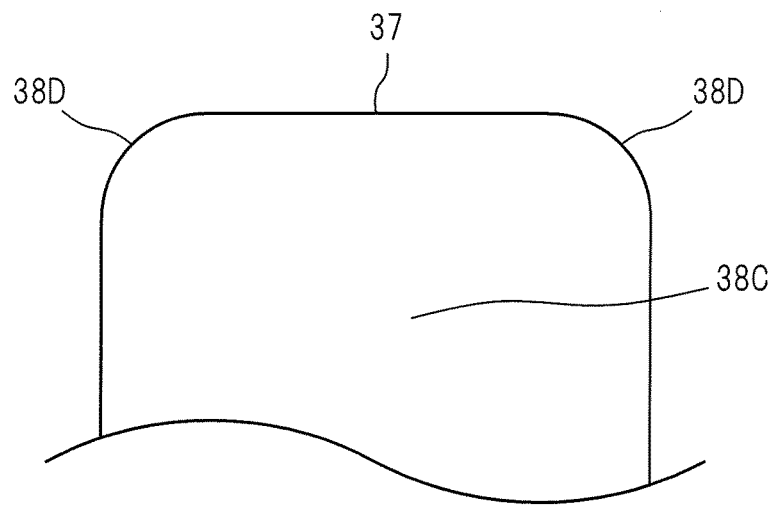
FIG. 4 shows schematics as viewed in a direction indicated by the arrow A of FIG. 3.
Figure 4:
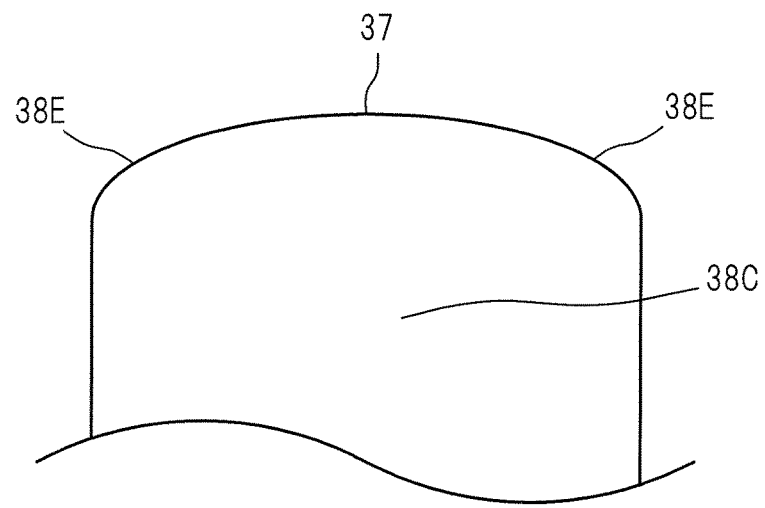

The protruding portion 37 is, as shown in FIG. 4, provided along an overall length in an axial direction of the latch body 30A. Therefore, the protruding portion 37 is provided with a sufficient rigidity, that is, enough to securely support the rod-shaped portion P1. Two ends (in the axial direction) of the protruding portion 37 have rounded edges, forming chamfers 38D. Accordingly, the protruding portion 37 would not catch on an inner surface of the plastic housing 10, and thus the latch 30 can be moved smoothly inside the plastic housing 10. It is to be understood that the shape of such a chamfered edge may be provided with a flat surface, or a gently rounded surface is formed as shown in FIG. 4(b) to provide chamfers 38E so that the ridges of the protruding portion 37 in its entirety are shaped like a barrel.

As shown in FIGS. 2 and 5, the ratchet 40 is a substantially plate-shaped member made of metal, of which a second hole 41 perforate in a direction of thickness is fitted on an outer periphery of the second boss 12 of the plastic housing 10 so that the ratchet 40 is rotatably supported on the plastic housing 10. The ratchet 40 has an axis of rotation parallel to an axis of rotation of the latch 30. The ratchet 40 includes a substantially sectorial main body portion 42 which is located on an upper-left side of the second hole 41, and a lower-left corner of the main body portion 42 is configured to provide a lock engaging portion 42A which is contactable with the latch 30. The lock engaging portion 42A enters the lock recess 34 of the latch 30 when the latch 30 is in the closed state, and serves to maintain the closed state of the latch 30, while it comes in contact with the open contact surface 35, and serves to maintain the open state of the latch 30.

From an upper end of the main body portion 42, further upwardly elongated is a slender arm 43, and at a distal end of the arm 43 is formed a hook 44 on which a right end of a tension spring 75 as one example of a biasing member is hitched. Since the end portion of the tension spring 75 is engaged with the hook 44 which is provided by the crooked distal end of the arm 43, the number of parts can be reduced in comparison with another configuration in which a separately provided part such as a rivet placed fixedly into the arm 43 is used to engage the end portion of the tension spring 75. The arm 43 also has a hole 48 formed as shown in FIG. 2, and a rod 70 for operation of the latch device 1 for a vehicle from the locked state to the unlocked state is pivotally connected to the hole 48 by a rivet 71.

As shown in FIG. 5, a pin 45 protruding frontward is press-fitted in the main body portion 42 at a location shifted slightly rightward of the lock engaging portion 42A. Moreover, the ratchet 40 includes a flange 47 protruding frontward in the axial direction of the hole at a location around the second hole 41, as shown in FIG. 2. The flange 47 protrudes to an extent corresponding to the thickness of the lever member 50, and when the latch 30 is in the closed state, the lever member 50 is brought into contact with the flange 47 by the biasing force of the tension spring 75, so that play of the lever member 50 is eliminated.

The lever member 50 is an operation mechanism for interlocking an operation of the ratchet 40 with the latch 30. The lever member 50 is an elongate plate-shaped member, and a hole 51 formed substantially at the center along the length is fitted on the pin 36 of the latch 30 so that the lever member 50 is rotatably supported on the latch 30.

The lever member 50 includes an action arm 52 and an operation arm 53 which extend from the axis of rotation, in the rightward-and-downward direction and in the upward direction, respectively. The action arm 52 is provided with a guide hole 52A having a modified quadrilateral shape. The pin 45 of the ratchet 40 is disposed inside the guide hole 52A. A distal end of the action arm 52 is configured to provide a stopper surface 52B which is in contact with the flange 47 of the ratchet 40 to eliminate play of the lever member 50. A distal end of the operation arm 53 is configured as a hook 54, and a left end of the tension spring 75 is hitched on the hook 54. Since the end portion of the tension spring 75 is engaged with the hook 54 which is provided by the crooked distal end of the operation arm 53, the number of parts can be reduced in comparison with another configuration in which a separately provided part such as a rivet placed fixedly into the operation arm 53 is used to engage the end portion of the tension spring 75.

The tension spring 75 is, as described above, configured such that its two end portions are hitched on the ratchet 40 and the lever member 50, respectively, to impart a biasing force which attracts the main body portion 42 of the ratchet 40 and the operation arm 53 of the lever member 50 toward each other all the time. This biasing force also serves to produce a force biasing the lock engaging portion 42A of the ratchet 40 toward the latch 30.

The load-receiving member 80 is a plastic member which is configured to come in contact with the rod-shaped portion P1 of the striker P to receive a load from the striker P. Although a detailed description is omitted, the load-receiving member 80 has a load-receiving surface 89A provided on a lower end thereof and configured to come in contact with the rod-shaped portion P1 in the locked state so that a load received from the rod-shaped portion P1 by the load-receiving member 80 is transmitted to the flange 28 (see FIG. 2) of the reinforcing plate 20, and received by the reinforcing plate 20.

As shown in FIG. 6, the lower case 10A and the upper case 10B are joined together to make a box-shaped configuration, and are combined with the reinforcing plate 20 and fixed to the bracket S2 by the bolts 90. Each bolt 90 includes a shank 91, a threaded portion 92 provided on a distal end portion of the shank 91, and a flanged head 93 provided at a proximal end thereof. The shank 91 is thicker than the threaded portion 92, i.e., has a diameter larger than a ridge of the threaded portion 92, and a step formed by this difference in diameter serves to receive a fastening force applied when it is tightly fastened to the weld nut WN. With this configuration, the costs can be reduced in comparison with another configuration in which a metal collar is used.

The lower case 10A and the upper case 10B with the constituent members such as a latch 30 mounted therein are arranged with their open sides facing each other into a boxlike configuration; thereafter, the shank 91 of the bolt 90 is inserted into the bolt hole 11H, and the threaded portion 92 is screwed into the weld nut WN of the bracket S2, so that the resulting assembly is fixed to the bracket S2. A spring washer 95 is disposed between the flanged head 93 and the reinforcing plate 20 to hold the latch device 1 for a vehicle between the bracket S2 and the flanged head 93 with the help of the elastic force of the spring washer 95. The fastening state at the first boss 11 with the bolt 90 has been described above with reference to FIG. 6; it is however to be understood that fastening at the second boss 12 with the bolt 90 may be carried out in exactly the same manner. Thus, a description of the fastening at the second boss 12 will not be given herein.

A description will be given of an operation of the latch device 1 for a vehicle, configured as described above.

In the pre-operated state shown in FIG. 5, the rod-shaped portion P1 of the striker P is located deepest into the receptacle slot 2A of the housing 2, and the hook-shaped portion 33 of the latch 30 holds the rod-shaped portion P1 inside from below. The lock engaging portion 42A is disposed in the lock recess 34 of the latch 30 and restrains the rotation of the latch 30. In other words, the latch 30 is in the closed state, and the latch device 1 for a vehicle is in the locked state. In this state, the tension spring 75 is producing a tensile force, and the lock engaging portion 42A of the ratchet 40 is brought into contact with the bottom of the lock recess 34. The rod-shaped portion P1 of the striker P is in contact with the load-receiving surface 89A of the load-receiving member 80, and the load applied from the striker P to the latch device 1 for a vehicle is transmitted through the load-receiving member 80 to the flange 28 (see FIG. 2) of the reinforcing plate 20 and received by the reinforcing plate 20.

Figure 7:
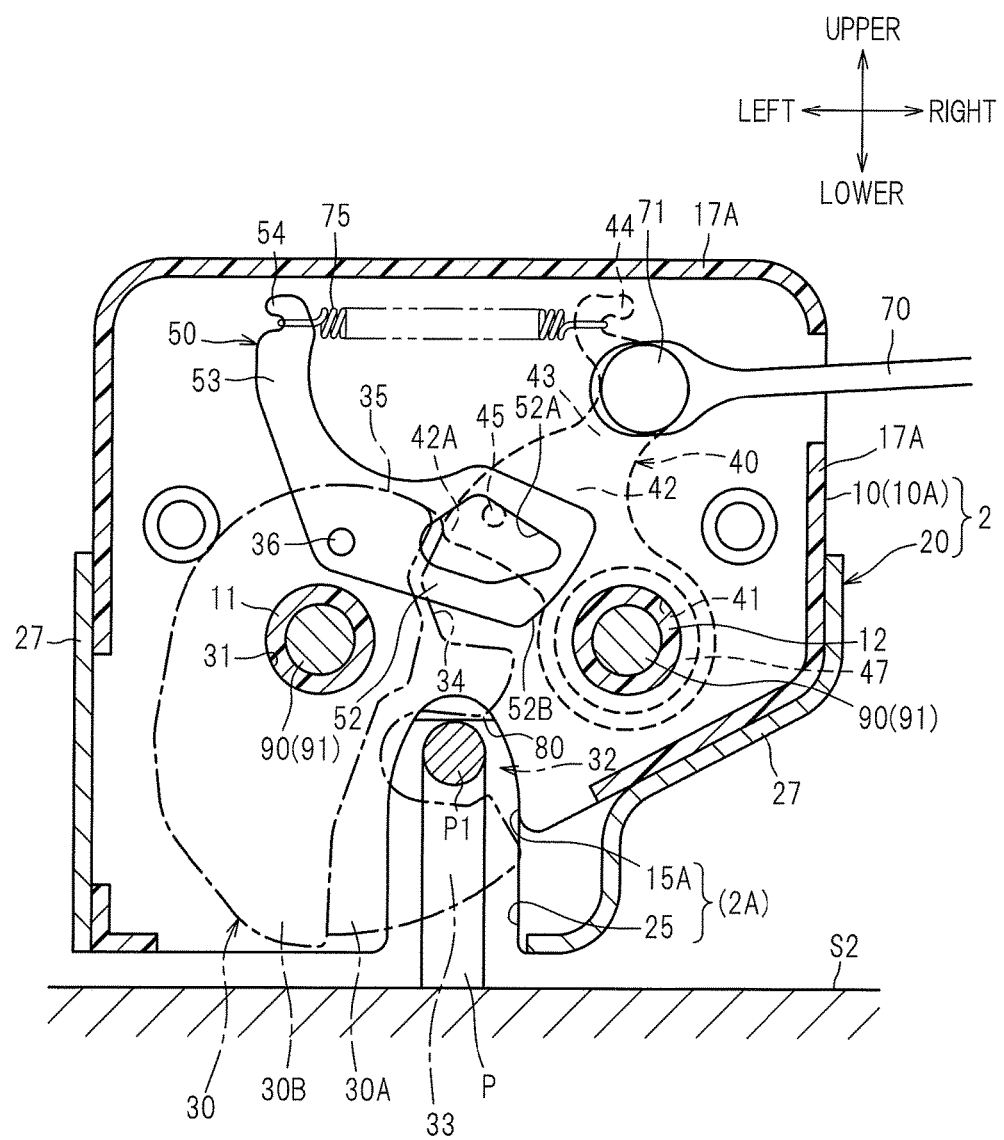
FIG. 7 is a diagram for explaining an operation of the latch device for a vehicle, showing a state in which a rod has been pulled slightly.

Starting from the pre-operated state shown in FIG. 5, when the rod 70 is pulled, the latch device 1 for a vehicle operates as follows: first, as shown in FIG. 7, the ratchet 40 rotates clockwise, and the pin 45 of the ratchet 40 pushes the right upper edge of the guide hole 52A, causing the lever member 50 to rotate counterclockwise while stretching the tension spring 75. In FIG. 7, though no substantial change would be seen from the state shown in FIG. 5, the force applied to the lever member 50 is gradually causing the latch 30 to rotate clockwise by means of the pin 36.

Figure 8:
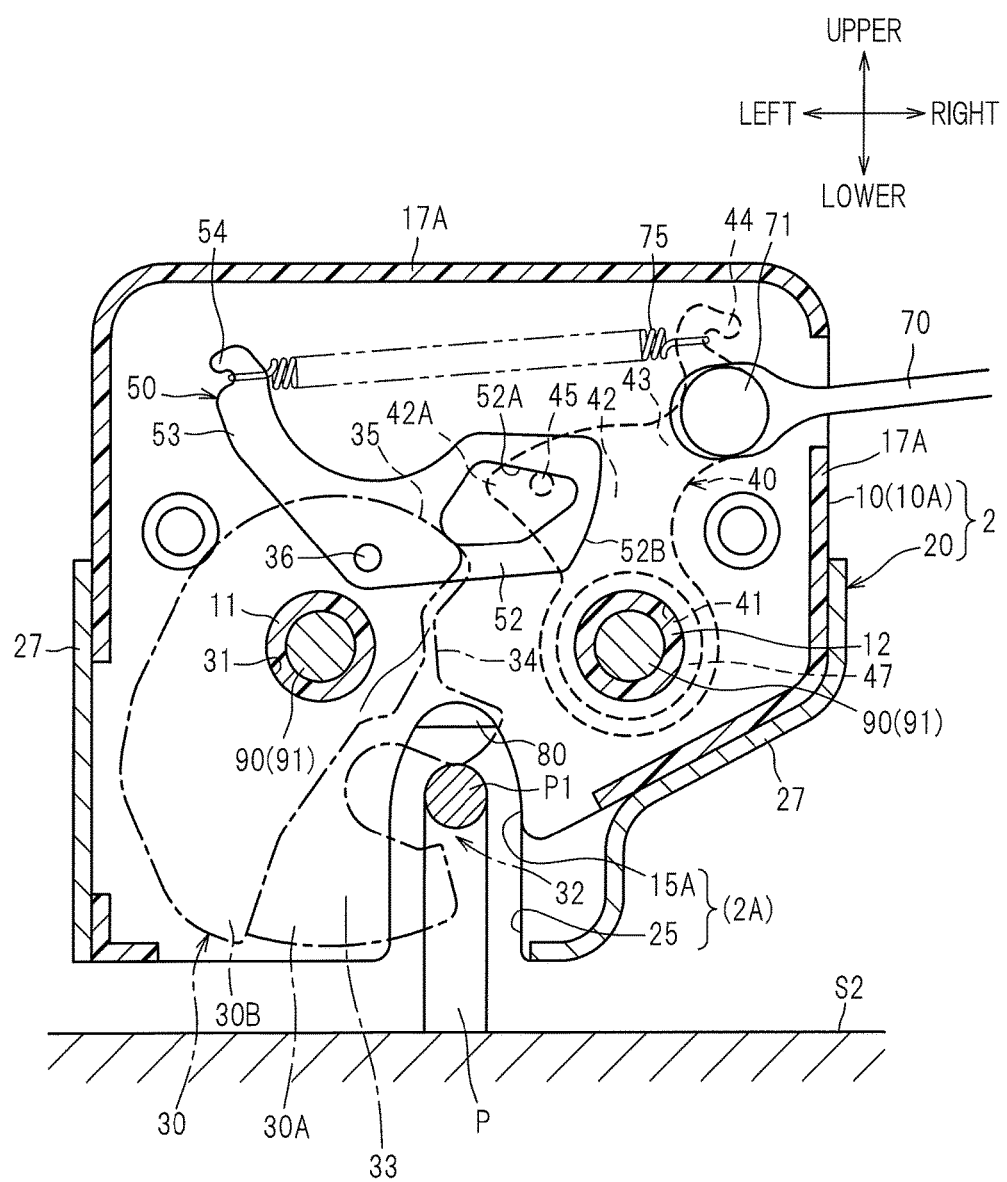
FIG. 8 is a diagram for explaining an operation of the latch device for a vehicle, showing a state in which the rod has been pulled greatly.

When the rod 70 is pulled further, as shown in FIG. 8, the ratchet 40 is caused to further rotate clockwise, and the lock engaging portion 42A is fully disengaged from the lock recess 34. Then, the latch 30 is caused to rotate clockwise by the force received through the pin 36 from the lever member 50, and the lock engaging portion 42A is disposed to face the open contact surface 35 of the latch 30.

Figure 9:
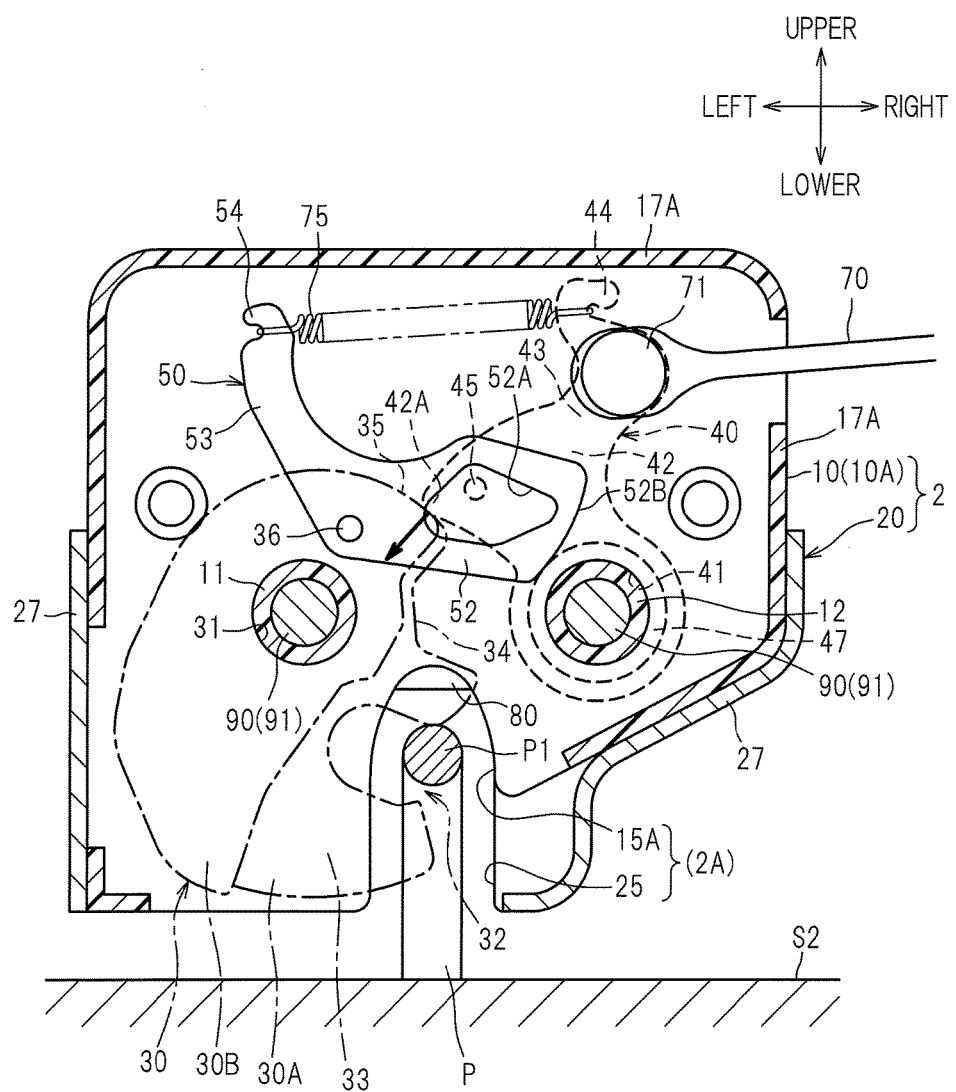
FIG. 9 is a diagram for explaining an operation of the latch device for a vehicle, showing a state in which the rod has been returned with a ratchet resting in contact with the latch.

From the state shown in FIG. 8, when the rod 70 is allowed to return by the action of the tensile force of the tension spring 75, as shown in FIG. 9, the lock engaging portion 42A of the ratchet 40 is brought into contact with the open contact surface 35 of the latch 30. Then, the force of the ratchet 40 pushing the latch 30 is directed from the point of contact between the lock engaging portion 42A and the open contact surface 35 toward the center of curvature of the open contact surface 35. Hereupon, the center of curvature of the open contact surface 35 is shifted to the right with respect to the axis of rotation of the latch 30 in the range of contact with the lock engaging portion 42A, and thus the force of the ratchet 40 pushing the latch 30 as produced by the biasing force of the tension spring 75 serves as a force (rotation moment) causing the latch 30 to rotate clockwise, that is, toward the open state.

In this way, when this rotation moment causes the latch 30 to rotate clockwise with the open contact surface 35 caused to slide on the lock engaging portion 42A, as shown in FIG. 10, the latch 30 gets in the open state, so that the rod-shaped portion P1 of the striker P can be disengaged from the receptacle slot 2A. In other words, the latch device 1 for a vehicle is shifted to the unlocked state.

To return the latch device 1 for a vehicle from the unlocked state to the locked state, starting from the state as shown in FIG. 10, the rod-shaped portion P1 of the striker P is caused to enter the receptacle slot 2A, and pressed against the slot 32 of the latch 30, to thereby cause the latch 30 to rotate counterclockwise. Then, the lock engaging portion 42A in contact with the open contact surface 35 is caused to slide on the open contact surface 35, and when the rotation of the latch 30 proceeds to a sufficient degree, the lock engaging portion 42A is caused to enter the lock recess 34 with the help of the biasing force of the tension spring 75. Accordingly, the lock state shown in FIG. 5 is restored.

Figure 11:
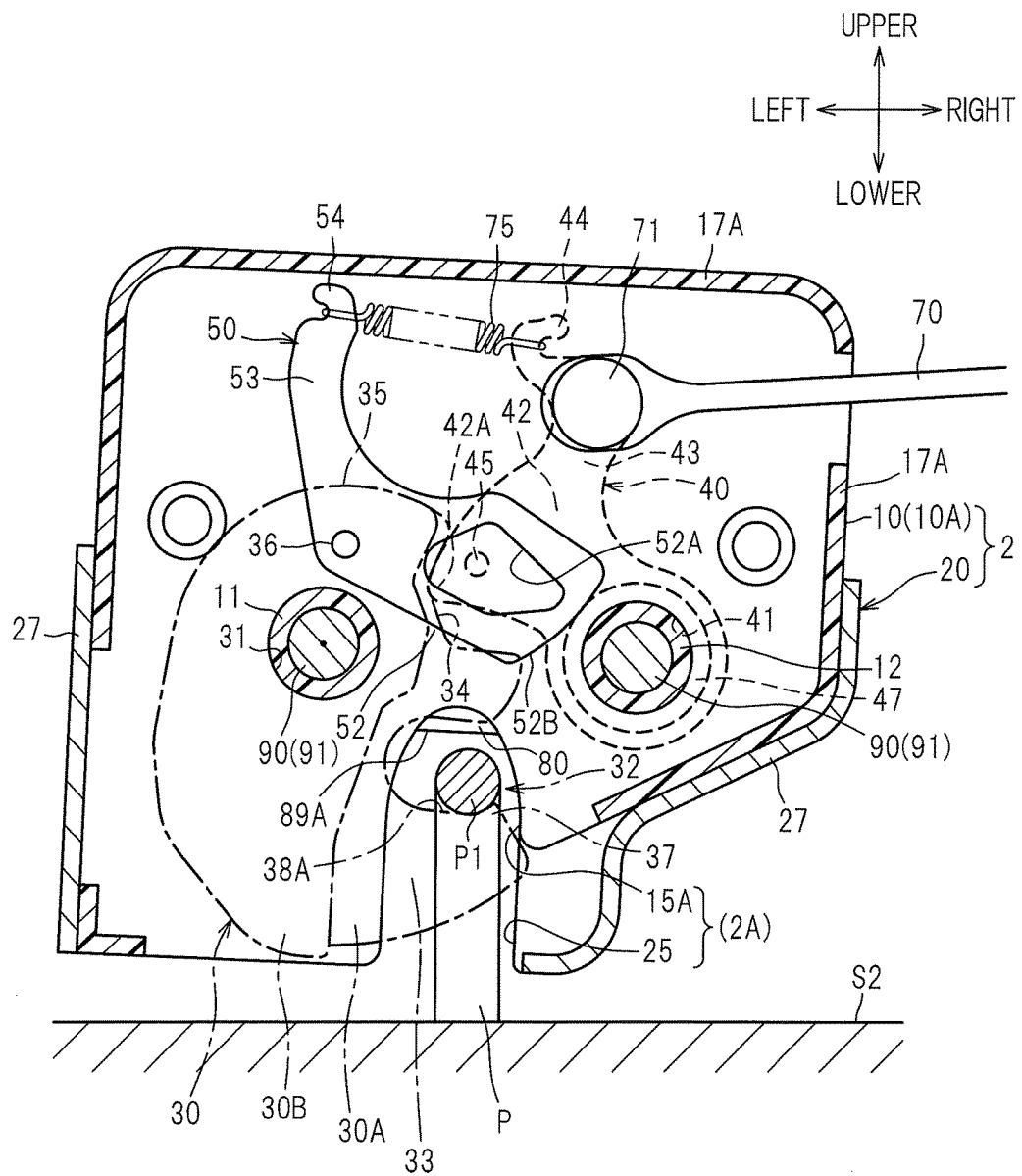
FIG. 11 is a diagram showing a state resulting from an attempt made to pull away the latch device for a vehicle from a striker in an upward direction.

Incidentally, if an abrupt operation of tilting forward the side frame S1 (see FIG. 1) of the backrest of the vehicle seat with the latch device 1 for a vehicle in the locked state as shown in FIG. 5 is performed without manipulating the rod 70, the latch device 1 for a vehicle is moved upward away from the striker P. Then, the rod-shaped portion P1 is caused to strongly push the first support surface 38A of the hook-shaped portion 33 of the latch 30, and causes the latch 30 to rotate clockwise as shown in FIG. 11. The rod-shaped portion P1 thus slides on the first supports surface toward the distal-end side of the hook-shaped portion 33 (toward the exit-side of the slot 32), and comes in contact with the protruding portion 37.

Figure 12:
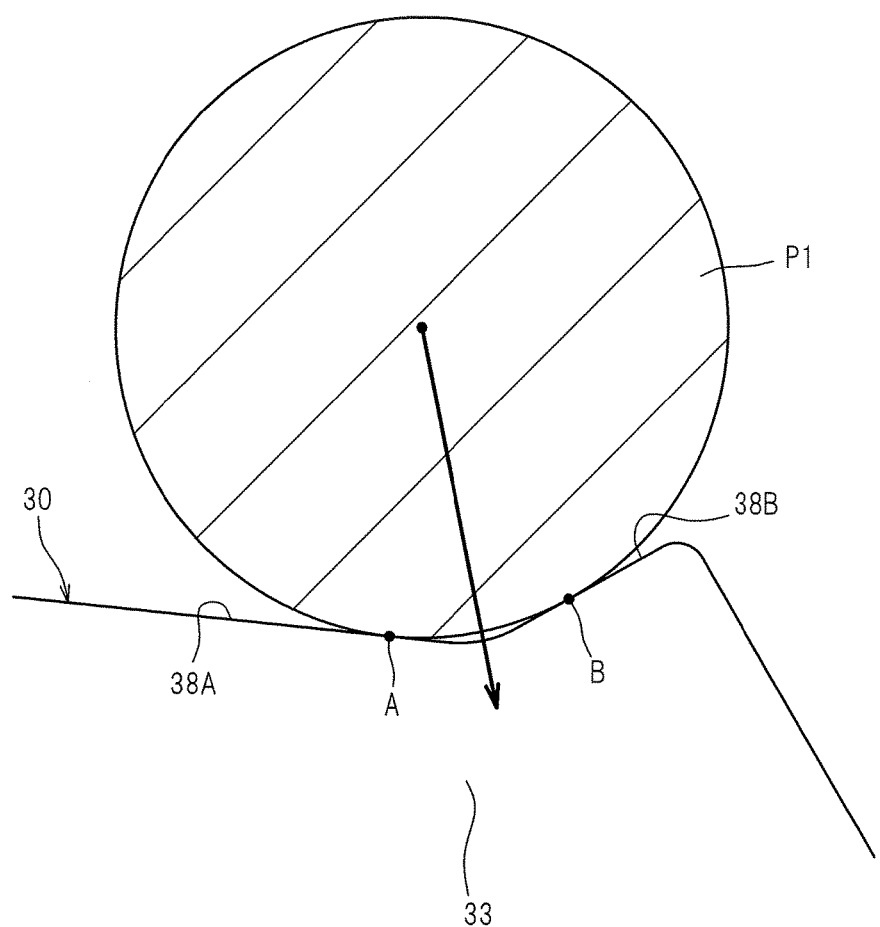
FIG. 12 is an enlarged view showing a state of contact between the hook-shaped portion and the rod-shaped portion in FIG. 11

At this time, the rod-shaped portion P1 is in contact with the first support surface 38A at a contact point A and with the second support surface 38B at a contact point B as shown in an enlarged view of FIG. 12. To be more specific, the rod-shaped portion P1 is pressed against the hook-shaped portion 33 in a direction indicated by the arrow in FIG. 12, and this pressing force is supported by two surfaces because the rod-shaped portion P1 is brought into contact concurrently with the first support surface 38A and with the second support surface 38B. Accordingly, in the latch device 1 for a vehicle as configured according to the present embodiment, even when a force which would tend to cause the latch device 1 for a vehicle to disengage from the striker P is applied, the latch 30 can firmly hold the rod-shaped portion P1.

Although one embodiment of the present invention has been described above, the present invention is not limited to the above-described embodiment, and can be put into practice with modifications made where appropriate.

Figure 13:
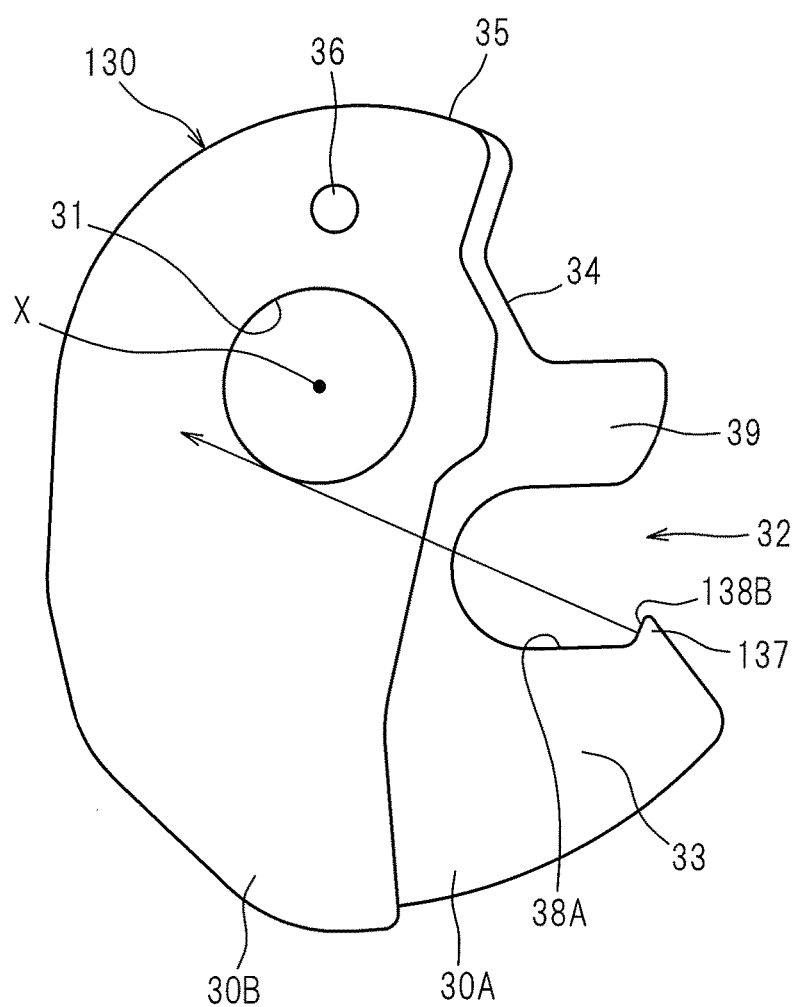
FIG. 13 is an enlarged view of the latch according to a modified embodiment.

For example, the protruding portion 37 is preferably configured such that its protrusion from the first support surface 38A is maximized as long as the rod-shaped portion P1 can smoothly engage into and disengage from the slot 32. Meanwhile, the second support surface 138B may be configured, as in the latch 130 shown in FIG. 13, to face toward an axis X of rotation on which the latch 130 is rotatable relative to the housing 2, or to face toward a position closer to the proximal end of the hook-shaped portion 33 than the axis X of rotation; with this configuration, the hook-shaped portion 33 can firmly hold the rod-shaped portion P1 even when a very large force is applied from the rod-shaped portion P1 to the second support surface 138B. On the other hand, the second surface 138B may be configured, conversely, to face toward a position closer to the opening of the slot 32 (to the right in FIG. 13); with this configuration, the hook-shaped portion 33 and the rod-shaped portion P1 can be engaged with each other with increased ease.

Figure 14:
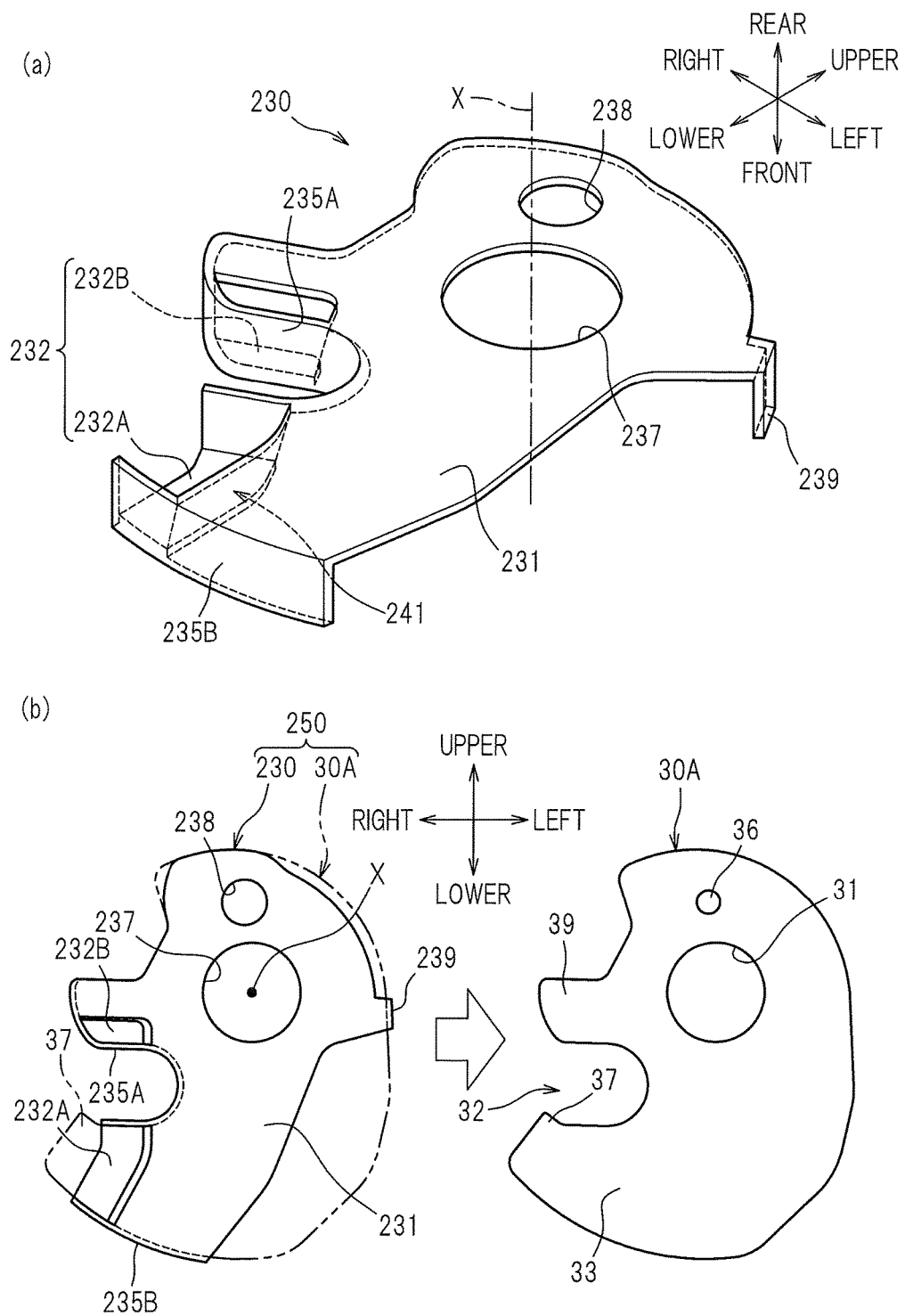
FIG. 14 shows the latch according to another modified embodiment, and includes (a) a perspective view of a cover, and (b) a view for explaining a process of mounting the cover on a latch body.

In the above-described embodiment, the cover 30B of the latch 30 is configured to be mounted onto the latch body 30A in a direction that is along the axial direction of the first hole 31; however, an alternative configuration of a latch 250 as shown in FIGS. 14 (a), (b) may be possible in which a cover is mounted onto the latch body 30A from its side (in a direction that is along the plane orthogonal to the thickness direction). More specifically, this cover 230 in this modified embodiment is a part injection molded of a plastic material, and includes a first cover portion 231 that covers at least a part of a surface of one side (a back side in this embodiment) of the latch body 30A extending orthogonal to the axis X of rotation thereof, and a second cover portion 232 that covers at least a part of a surface of the other side (a front side in this embodiment) of the latch body 30A, as well as connecting portions 235A, 235B that connect the first cover portion 231 and the second cover portion 232 to cover the sides of the latch body 30A. The cover 230 herein are provided with two or more connecting portions, and thus is configured to be unlikely to come off from the latch body 30A.

The second cover portion 232 includes a hook cover portion 232A that covers a distal end portion of the hook-shaped portion 33, and a projection cover portion 232B that covers a lower half of the projecting portion 39.

The connecting portion 235A extends to cover a portion of the side of the latch body 30A along the inner surface of the slot 32 and the distal end of the projecting portion 39. On the other hand, the connecting portion 235B extends to cover a portion of the latch body 30A over a lower side of the hook-shaped portion 33. With this configuration, the first cover portion 231, the connecting portion 235A, the hook cover portion 232A, and the connecting portion 235B form a closed loop 241 as viewed from a lateral direction (see FIG. 14 (a)).

As shown in FIG. 14 (b), the first cover portion 231 and the second cover portion 232 are configured such that they do not overlap each other as viewed in a direction along the axis X of rotation of the latch body 30A. With this configuration, the cover 230 can be made by injection molding in which a mold is separated in a direction along the axis X of rotation, and thus the removal of the mold is performed easily.

The first cover portion 231 has a through hole 237 formed in a position corresponding to the first hole 31 in which the first boss 11 as a pivot shaft of the latch body 30A is disposed. The first cover portion 231 also has a through hole 238 formed in a position corresponding to the pin 36 of the latch body 30A. Further, at an edge of the first cover portion 231 opposed to the slot 32 (i.e., the left edge), an engaging portion 239 extending around the side of the latch body 30A to engage with the latch body 30A is provided.

The cover 230 configured as described above is designed to be mounted onto the latch body 30A in a direction along the plane orthogonal to the axis X of rotation. To be more specific, the cover 230 is mounted onto the latch body 30A in a lengthwise direction of the slot 32. In this mounting process, the hook-shaped portion 33 is fitted into the loop 241 while the first cover portion 231 is being slightly warped rearward, and the projecting portion 39 is sandwiched between the first cover portion 231 and the projection cover portion 232B. In this process, the through hole 238 is fitted on the pin 36, and the engaging portion 239 is caused to overpass the rear side surface of the latch body 30A and engaged on the left side of the latch body 30A. By these engagements between the hook-shaped portion 33 and the loop 241 fitted thereon, between the projecting portion 39 and the projection cover portion 232B engaged thereon, between the engaging portion 239 and the side of the latch body 30A engaged thereby and between the pin 36 and the through hole 238 fitted thereon, the cover 230 becomes unlikely to come off from the latch body 30. In particular, the engagements between the hook-shaped portion 33 and the loop 241 fitted thereon and between the projecting portion 39 and the projection cover 232B engaged thereon serve to prevent the cover 230 from slipping in a direction along the axis X of rotation relative to the latch body 30A.

The latch 250 assembled as described above is pivoted on the first boss 11 inserted in the first hole 31 and the through hole 237. With this configuration in which the latch is pivotally supported on the first boss 11, the cover 230 is also restrained from slip in a direction orthogonal to the axis X of rotation, and thus is prevented from slipping or coming off from the latch body 30A.

In this modified example of the cover 230 as well, the projecting portion 37 is exposed through the cover 37, and thus the operating noise of the latch 30 can be reduced with the help of the soft cover 37, while the projecting portion 37 exposed through the cover 230 can be used to support the rod-shaped portion P1 so that the latch body 30A itself firmly support the rod-shaped portion P1. Moreover, when the cover 230 is mounted on the latch body 30A, the mounting work is easy.

To further elaborate other variations of the latch device 1 for a vehicle, one example not illustrated herein may be configured to provide a cover 30B for the latch 30 by coating rubber on the latch body 30A.

Furthermore, the latch device 1 for a vehicle may be provided, not only on a backrest of a seat for a vehicle such as a car, but on a seating portion or legs of a seat for a vehicle, or may be used as a device for locking a portion for closing an opening of a trunk of a car or the like. The seat for a vehicle may include seats for a vehicle other than a car, such as a ship, an aircraft, etc.

The invention claimed is:

1. A latch device for a vehicle, for locking or unlocking by engaging with or disengaging from a rod-shaped portion, wherein the latch device for a vehicle comprises:
    a housing which includes a plastic housing made of plastic and a reinforcing plate made of metal, the reinforcing plate being disposed on an outer side of the plastic housing;
    a load-receiving member configured to be mounted to the reinforcing plate; and
    a latch rotatably supported by the housing, the latch including a hook-shaped portion engageable with the rod-shaped portion to form a locked state,
    wherein the hook-shaped portion includes:
        a first support surface configured to be opposed to the rod-shaped portion in the locked state;
        a protruding portion located in a position closer to a distal end of the hook-shaped portion than the first support surface, the protruding portion being configured to protrude relative to the first support surface; and
        a second support surface provided on the protruding portion, the second support surface being configured to be opposed to the rod-shaped portion,
    wherein the first support surface and the second support surface are configured to face in different directions, and to thereby be concurrently contactable with the rod-shaped portion if there is an attempt to pull away the latch device,
    the load-receiving member has a load-receiving surface configured to contact the rod-shaped portion in the locked state,
    the reinforcing plate is configured to receive a load through the load-receiving member from the rod-shaped portion,
    the plastic housing includes a plastic base portion extending in such a direction as to cross an axial direction of the latch, and a plastic sidewall portion extending from an outer peripheral edge of the plastic base portion in the axial direction,
    the reinforcing plate includes a reinforcing base portion, a reinforcing sidewall portion, and a flange,
    the reinforcing base portion is disposed on the plastic base portion,
    the reinforcing sidewall portion is disposed on the plastic sidewall portion,
    the flange extends in a direction away from the plastic base portion, and
    the flange is configured to contact the load-receiving member to withstand a force received by the load-receiving member from the rod-shaped portion.

2. The latch device for a vehicle according to claim 1, wherein the second support surface is configured to face toward an axis of rotation on which the latch is rotatable relative to the housing, or to face toward a position closer to a proximal end of the hook-shaped portion than the axis of rotation.

3. The latch device for a vehicle according to claim 1, wherein the housing has a receptacle slot so formed as to receive the rod-shaped portion therein, and
    wherein a side of the protruding portion located at the distal end of the hook-shaped portion of the latch in an unlocked state is aligned with an edge of the receptacle slot when viewed in a direction of an axis of rotation of the latch.

4. The latch device for a vehicle according to claim 3, wherein the load-receiving member is disposed in a deepest position in the receptacle slot.

5. The latch device for a vehicle according to claim 1, wherein the latch comprises a latch body, and a cover that covers part of the latch body, the cover being softer than the latch body, and
wherein the protruding portion is exposed out of the cover.

6. The latch device for a vehicle according to claim 1, wherein the protruding portion is provided along an overall length in an axial direction of the latch.

7. The latch device for a vehicle according to claim 1, wherein the protruding portion has two ends in an axial direction of the latch, the two ends having chamfered edges.

8. The latch device for a vehicle according to claim 1, wherein the reinforcing sidewall portion includes a first sidewall portion and a second sidewall portion which are disposed separate from each other.

9. The latch device for a vehicle according to claim 8, wherein the second sidewall portion is contoured to fit the plastic sidewall portion and includes a curved portion having an end disposed separate from the plastic housing.

10. The latch device for a vehicle according to claim 9, wherein the rod-shaped portion is part of a striker that includes a base end fixed to a target object in the vehicle,
the rod-shaped portion is disposed apart from the base end, and
the end of the curved portion in the locked state is nearer to the base end of the striker than to the rod-shaped portion of the striker.

11. The latch device for a vehicle according to claim 10, further comprising a bolt with which the housing is fixed to a seat,
wherein as viewed in a direction parallel to a protruding direction of the striker, the curved portion in the locked state overlaps the bolt.

12. A latch device for a vehicle, for locking or unlocking by engaging with or disengaging from a rod-shaped portion, wherein the latch device for a vehicle comprises:
a housing which includes a plastic housing made of plastic and a reinforcing plate made of metal, the reinforcing plate being disposed on an outer side of the plastic housing;
a load-receiving member configured to be mounted to the reinforcing plate; and
a latch rotatably supported by the housing, the latch including a hook-shaped portion engageable with the rod-shaped portion to form a locked state,
wherein the load-receiving member has a load-receiving surface configured to contact the rod-shaped portion in the locked state,
wherein the reinforcing plate is configured to receive a load through the load-receiving member from the rod-shaped portion,
the plastic housing includes a plastic base portion extending in such a direction as to cross an axial direction of the latch, and a plastic sidewall portion extending from an outer peripheral edge of the plastic base portion in the axial direction,
the reinforcing plate includes a reinforcing base portion, a reinforcing sidewall portion, and a flange,
the reinforcing base portion is disposed on the plastic base portion,
the reinforcing sidewall portion is disposed on the plastic sidewall portion,
the flange extends in a direction away from the plastic base portion, and
the flange is configured to contact the load-receiving member to withstand a force received by the load-receiving member from the rod-shaped portion.

13. The latch device for a vehicle according to claim 12, wherein the housing has a receptacle slot so formed as to receive the rod-shaped portion therein, and
wherein the load-receiving member is disposed in a deepest position in the receptacle slot.

14. The latch device for a vehicle according to claim 12, wherein the reinforcing sidewall portion includes a first sidewall portion and a second sidewall portion which are disposed separate from each other.

15. The latch device for a vehicle according to claim 14, wherein the second sidewall portion is contoured to fit the plastic sidewall portion and includes a curved portion having an end disposed separate from the plastic housing.

16. The latch device for a vehicle according to claim 15, wherein the rod-shaped portion is part of a striker that includes a base end fixed to a target object in the vehicle,
the rod-shaped portion is disposed apart from the base end, and
the end of the curved portion in the locked state is nearer to the base end of the striker than to the rod-shaped portion of the striker.

17. The latch device for a vehicle according to claim 16, further comprising a bolt with which the housing is fixed to a seat,
wherein as viewed in a direction parallel to a protruding direction of the striker, the curved portion in the locked state overlaps the bolt.

* * * * *